US012790194B2

(12) United States Patent
Cammish et al.

(10) Patent No.: US 12,790,194 B2
(45) Date of Patent: Nov. 10, 2026

(54) CLOSURE PROCESSING EQUIPMENT AND METHOD

(71) Applicant: HOFFMANN-LA ROCHE INC., Little Falls, NJ (US)

(72) Inventors: Neil B. Cammish, Basel (CH); Guido Drees, Basel (CH)

(73) Assignee: HOFFMANN-LA ROCHE INC., Little Falls, NJ (US)

( * ) Notice: Subject to any disclaimer, the term of this patent is extended or adjusted under 35 U.S.C. 154(b) by 323 days.

(21) Appl. No.: 18/572,493

(22) PCT Filed: Aug. 14, 2022

(86) PCT No.: PCT/EP2022/072742
§ 371 (c)(1),
(2) Date: Dec. 20, 2023

(87) PCT Pub. No.: WO2023/020978
PCT Pub. Date: Feb. 23, 2023

(65) Prior Publication Data

US 2024/0199400 A1 Jun. 20, 2024

(30) Foreign Application Priority Data

Aug. 16, 2021 (EP) .................................... 21191529

(51) Int. Cl.
*B67B 1/04* (2006.01)

(52) U.S. Cl.
CPC .................................... *B67B 1/045* (2013.01)

(58) Field of Classification Search
None
See application file for complete search history.

(56) References Cited

U.S. PATENT DOCUMENTS 732,539 A * 6/1903 Fyfe .......................... B67B 1/04 53/324
7,794,668 B2 * 9/2010 Bar ....................... B01L 3/5025 422/651

(Continued)

FOREIGN PATENT DOCUMENTS

CN 109250661 A * 1/2019 ............... B67B 1/04
EP 0125996 A1 11/1984

(Continued)

OTHER PUBLICATIONS

Written Opinion and International Search Report issued Nov. 15, 2022 in Intl. Appl. No. PCT/EP2022/072742.

*Primary Examiner* — Tanzim Imam
(74) *Attorney, Agent, or Firm* — MEDLER FERRO WOODHOUSE & MILLS PLLC

(57) ABSTRACT

A closure processing equipment for closing openings of a number of containers includes a number of stopper members, a container holder and a set of compensation structures. Each of the stopper members is made of an elastic material, has a plug portion configured to fit into an opening of one of the number of containers and has a cover portion configured to abut a boundary surface adjacent to the opening of the one of the number of containers. The container holder has a number of container seats each configured to receive one of the number of containers in a predefined position. Each compensation structure of the set of compensation structures is configured to compensate a container manufacturing dimension tolerance. The set of compensation structures includes diverse compensation structures to compensate different container manufacturing dimension tolerances.

20 Claims, 3 Drawing Sheets

(56) References Cited

U.S. PATENT DOCUMENTS

| | | | |
|---|---|---|---|
| 9,522,752 B2 | 12/2016 | Wissner et al. | |
| 9,963,259 B2 | 5/2018 | Deutschle et al. | |
| 2005/0194059 A1 | 9/2005 | Py | |
| 2016/0200461 A1 * | 7/2016 | Broadbent ............ | B65B 7/2821 53/426 |
| 2018/0148222 A1 * | 5/2018 | Deutschle .............. | B65D 85/30 |
| 2020/0290756 A1 | 9/2020 | Deutschle et al. | |

FOREIGN PATENT DOCUMENTS

| | | |
|---|---|---|
| WO | 20110135085 A1 | 11/2011 |
| WO | 2015023924 A2 | 2/2015 |

* cited by examiner

CLOSURE PROCESSING EQUIPMENT AND METHOD

TECHNICAL FIELD

The present invention relates to a closure processing equipment according to the preamble of independent claim 1 and more particularly to a method of closing openings of containers.

Such closure processing equipment typically comprises a plurality of stopper members and a container holder, wherein each of the stopper members is made of an elastic material, has a plug portion configured to fit into an opening of one of the plurality of containers and has a cover portion configured to abut a boundary surface adjacent to the opening of the one of the plurality of containers, and wherein the container holder has a plurality of container seats each configured to receive one of the plurality of containers in a predefined position. Closure processing equipment of this type can be used for tightly and securely closing openings of containers.

BACKGROUND ART

In many chemical or pharmaceutical applications, liquid substances such as drug substances, chemical substances, substances of clinical trials or others are provided in specific containers such as vials, cartridges or the like. These containers typically have a hollow interior and an opening through which the interior is accessible. The opening typically is surrounded or limited by a boundary surface. The substances are filled into the interior of the containers and the openings are subsequently tightly closed.

For closing the containers, it is known to use elastomeric stoppers. Such stoppers may provide for tightly or even hermetically sealing the openings and additionally to allow retrieval of the substances out of the containers by piercing the stoppers with needles and introducing the needles into the substances.

Typically, stoppers have a plug portion and a cover portion. The plug portion is dimensioned to tightly fit into the opening and the cover portion is shaped to abut a boundary surface of the opening. More specifically, the stoppers are pressed into the openings such that the cover portions are pushed to the boundary surfaces and compressed to a certain extent to generate tightness. As required in many applications, stoppers and containers of the kind allow for an efficient aseptic filling and closing of the containers.

As mentioned, to achieve a sufficient tightness of the container after filling and closing, the stoppers have to be pressed into and/or onto surfaces of the containers. To hold the stoppers in such compressed state typically caps or cages are used which are arranged on and around the stoppers and openings. For example, it is known to crimp a partially formed metal cap about the head of the container and the cover portion of the stopper to fix and press the stopper to the container (crimp caps).

On a larger or industrial scale, containers, such as particularly vials, and stoppers are often dimensioned in predefined sizes. Like this, automated processing with standard equipment can be efficiently implemented. Further, for processing plural containers in a closing procedure, the container are often provided in container holders such as nests or the like. For example, WO 2015/023924 A2 describes a method for filling nested containers including a step of closing the containers.

For generally processing plural containers in a closing procedure, a respective plurality of stoppers is automatically mounted to the containers by pressing them into the openings of the containers and onto the boundary surfaces of the openings. However, since the containers typically have a considerable tolerance as to their height such that the containers may end at differing heights. Therefore, when automatically providing the stoppers into the openings of the containers, it is typically either not possible to uniformly process or move the stoppers, or to assure a uniform pressure achieved when pressing the stopper onto the boundary surfaces. Rather, it is required to measure the height of each single one of the containers and then individually move and press each single stopper in correspondence to the given height of the associated container. Particularly, when it is required to quickly close the containers such individual provision of stopper is cumbersome and inefficient.

Therefore, there is a need for a closure processing equipment and method allowing for efficiently closing a plurality of containers with a respective plurality of stoppers, wherein predefined pressure applied to the stoppers can be accurately assured.

DISCLOSURE OF THE INVENTION

According to the invention this need is settled by a closure processing equipment as it is defined by the features of independent claim 1, and by a method as it is defined by the features of independent claim 11. Preferred embodiments are subject of the dependent claims.

In one aspect, the invention is a closure processing equipment for closing openings of a number of containers. The containers can be containers used in pharmaceutical or chemical research, development or production such as cartridges or the like, or, in particular, vials.

The term "vial" as used herein can relate to a vial in the literal sense, i.e. a comparably small vessel or bottle, often used to store pharmaceutical products or pharmaceuticals or medications in liquid, powdered or capsuled form. The vial can be made of a sterilisable material such as glass or plastic such as, e.g., polypropylene, a cyclic olefin copolymer or a cyclic olefin polymer.

The closure processing equipment comprises a number of stopper members, a container holder and a set of compensation structures. Each of the number of stopper members is made of an elastic material, has a plug portion configured to fit into an opening of one of the number of containers and has a cover portion configured to abut a boundary surface adjacent to the opening of the one of the number of containers.

The term "member" in this connection and in the context of the following description can relate to a single piece unit. Such single piece unit can be embodied by fixing plural pieces or parts, e.g. made of different materials, together, to a monolithic element made of a single material, or a monolithic element made of one or more materials that are chemically or physically bonded in the manufacturing process such as molding an opaque polymer over a transparent substrate or vice versa.

The term "elastic" in connection with the stopper member can relate to properties of the material the stopper member is made of. More specifically, such material properties can be elasto-plastic and, in particular, compressible. Typically, elasticity relates to an ability to be deformed from an initial shape by a force or an impact, and to return to the initial shape when the force or impact is cancelled. Thereby, elasticity may also cover a partial return to the initial shape, wherein usually a return toward the initial shape to a predominant extent is required.

Advantageously, the material of the stopper members allows them to be sterilized and to maintain aseptic conditions. The stopper members can be embodied as one piece, i.e. as a monolithic element. The plug portions can be essentially cylindrical such that the match the geometry of the openings. To allow the cover portions to abut the boundary surfaces, the cover portions typically laterally or radially project over the plug portions. They can be more or less disc shaped.

The container holder has a number of container seats each configured to receive one of the number of containers in a predefined position. The term "position" as used in connection with the container seats of the container holder and stopper seats of the stopper holders described below may relate to a location and orientation of the containers or stopper members, respectively. In particular, the container seats advantageously are embodied to receive the containers in a predefined position by arranging them at a predefined location and at a predefined orientation and the stopper seats advantageously are embodied to receive the stopper members in a predefined position by arranging them at a predefined location and at a predefined orientation.

Each of the set of compensation structures is configured to compensate a container manufacturing dimension tolerance. The set of compensation structures comprises diverse compensation structures to compensate different container manufacturing dimension tolerances.

The term "container manufacturing dimension tolerance" relates to a leeway between the design of the container and the container actually resulting from manufacturing. In many cases, containers are manufactured in accordance with an industry standard. Thereby, typically such standards do provide tolerance limits within which the containers have to be manufactured. For example, the industry standard ISO 8362 defines shape and dimensions of injection containers and, in particular, vials, wherein tolerances are defined as well. E.g., the total manufacturing height tolerance of a vial is defined to be +/−0.5 mm. For example, the manufacturing dimension tolerance may relate to a height tolerance of the container, i.e. a deviation between the height of the manufactured container and the intended height of the container, e.g., in accordance with a standard. Additionally or alternatively, the manufacturing dimension tolerance can relate to the dimension of features of the container and/or a span between features of the container. For example, features of a container particularly relevant to closure of the container may include an exact location of an underside of a head of the container, to which a cap or closure is to clip for closing the container, or a groove in the head of the container having a similar function when closing the container.

The term "number of" in connection with the container, the stopper member, the container seats and the stopper seats may relate to one or more containers, stopper members, container seats or stopper seats, respectively. However, the invention may be particularly useful when this term relates to plural containers, stopper members, container seats or stopper seats, respectively, such that alternatively the term "plurality of" can be used.

The diverse compensation structures comprise at least two and advantageously more different types of compensation structures. In particular, each type of compensation structure can be designed to compensate a specific manufacturing dimension tolerance or a specific range of manufacturing dimension tolerances. Thereby, a broad variety of different compensation structures can be embodied in order to compensate manufacturing dimension tolerances. For example, the compensation structure can be embodied to clamp the container at an appropriate position such that irrespective of the exact height all containers end at the same vertical position. Or, in particular, the compensation structure can be arranged to compensate manufacturing height tolerances from below and/or from above as described in more detail below.

By providing the set of compensation structures, the closure processing equipment allows for efficiently compensating an individual leeway of each of the containers. More specifically, for each container an appropriate compensation structure can be selected and used such that the respective manufacturing dimension tolerance can be compensated. Like this, it can be achieved that a uniform pressure is applied from the stopper members to the containers when closing the containers in an efficient manner. Thus, a seal closing can reliably be generated for all containers and damages to the containers can be prevented.

Preferably, the number of container seats of the container holder is arranged in a grid of a first number of rows and a second number of columns. Such container holder may also be referred to as nest. By arranging the containers seats in a well-organized manner, the containers can efficiently be processed and, in particular automatically processed or closed.

Preferably, the closure processing equipment comprises a stopper holder having a number of stopper seats each configured to receive one stopper member of the number of stopper members in a predefined position. Such stopper holder allows for efficiently handling and processing the number of stopper members.

The number of stopper seats of the stopper holder preferably is arranged in correspondence with the number of container seats of the container holder. Thereby, the stopper seats can particularly be arranged in correspondence with the container seats by being located adjacent to the container seats when the stopper holder and the container holder are properly aligned to each other. For example, the stopper seats can be arranged in the same grid of the first number of rows and the second number of columns as the container seats.

In some embodiments, the compensation structures are configured to compensate manufacturing height tolerances of the containers from above or top down. For example, the compensation structure can be arranged as covers of specific thicknesses in order that a vertical top end of the assembly of container, stopper and cover are about the same for all containers.

Preferably, the set of compensation structures is embodied by the number of stopper members. Thereby, the term "embodied by" can be equivalent to implemented in. In particular, the compensation structures can be embodied by the stopper members by forming the stopper members in a specific manner or by equipping the stopper members with an appropriate means. Thereby, the stoppers may establish an efficient height tolerance compensation for the containers from above or top down.

Thereby, the cover portion of each of the number of stopper members preferably has a cover thickness configured to compensate a container manufacturing dimension tolerance. Like this, for each container a stopper member having an appropriate cover thickness can be selected such that all container stopper member combinations end more or less at the same vertical location. Thus, a uniform pressure can efficiently be applied to all stopper members at once, which allows efficient closing be means of legacy tools.

Further, the number of stopper members preferably comprises stopper members having cover portions with diverse cover thicknesses to compensate different container manufacturing dimension tolerances. Thus, the set of compensation structures can be implemented by providing stopper members with diversely thick cover portions. Like this, a dimension tolerance of each container can be compensated such that all containers together with their suited stopper member are more or less equally high. Like this, a uniform pressure can efficiently be applied such that a same tightness can be achieved at all containers involved.

In other embodiments, the compensation structures are configured to compensate manufacturing height tolerances of the containers from below or bottom up. For example, the compensation structure can be arranged as bottoms of the container seats of varying specific thicknesses in order that vertical top ends of all assemblies of container and stopper are about the same for all containers.

Preferably, the set of compensation structures comprises container seat inserts each configured to be arranged in one of the container seats of the container holder. When being arranged in one of the container seats of the container holder, each container seat insert defines a location and, in particular, a vertical location of a bottom of the container being received in the container seat in which the container seat insert is arranged. The container seat inserts allow to adjust the vertical location of each vial such that dimension tolerances can efficiently be compensated. Thereby, the seat inserts may establish an efficient height tolerance compensation for the containers from below or bottom up.

Thereby, each container seat insert preferably has an insert thickness configured to compensate a container manufacturing dimension tolerance and, particularly, a manufacturing height tolerance. The insert thickness may efficiently define a location and, in particular, a vertical location of the bottom of the container being received in the container seat in which the container insert is arranged. More specifically, the bigger the insert thickness of a container seat insert is, the more the associated container is vertically lifted such that the height or vertical end of the container can be adjusted. Thus, by selecting a container seat insert with a proper insert thickness for each container, it can be achieved that all containers in the container holder end at an essentially identical vertical level.

Further, the container seat inserts preferably have diverse insert thicknesses to compensate different container manufacturing dimension tolerances. Such seat inserts allows for efficiently selecting an appropriate seat insert for each container such that, in the end all containers end at an essentially identical vertical location.

In a similar way, the set of compensation structures may comprise stopper seat inserts each configured to be arranged in one of the stopper seats of the stopper holder. Such stopper seat inserts may be provided alternatively or additionally to the container seat inserts. Like tis, in addition to modifying the vial position to compensate for overall height tolerances by means of the container seat inserts, the stopper seat inserts may allow modification of stopper and/or clipping feature positions.

Each stopper seat insert may have an insert thickness configured to compensate a container manufacturing dimension tolerance and, particularly, a clipping feature or other dimension tolerance. Further, the stopper seat inserts may have diverse insert thicknesses to compensate different container manufacturing dimension tolerances.

In another aspect, the invention is a method of closing openings of containers. The method comprises the steps of: obtaining a number of containers each having an opening; measuring a dimension of each one of the number of containers to determine a container manufacturing dimension tolerance for each of the number of containers; obtaining a number of stopper members made of an elastic material, each having a plug portion configured to fit into an opening of one of the number of containers and a cover portion configured to abut a boundary surface adjacent to the opening of the one of the number of containers; obtaining a container holder having a number of container seats each configured to receive one of the number of containers in a predefined position; obtaining a set of compensation structures comprising diverse compensation structures to compensate different container manufacturing dimension tolerances; based on the determined container manufacturing dimension tolerances of the number of containers, selecting a compensation structure of the set of compensation structures per container of the number of containers suitable to compensate the determined container manufacturing dimension tolerance of the container; positioning the number of containers in the number of container seats of the container holder; providing each of the number of containers with one of the selected compensation structures being suitable to compensate the respective determined container manufacturing dimension tolerance; and closing each of the openings of the number of containers by fitting the plug portion of one of the stopper members into the respective opening and abutting the cover portion of the one of the stopper members to a boundary surface adjacent to the respective opening.

The sequence of steps of the method according to the invention listed above and the preferred further steps listed below is not bound to the order the steps are listed. Rather, the method can also be executed in a different sequence. In particular, the listed steps may but don't have to be executed in the sequence they are listed and described herein. For example, even though the opposite sequence is listed above, the step of measuring the dimensions of the containers can also be performed after positioning the containers in the container seats.

Advantageously, the method is implemented with the closure processing equipment according to the invention or any preferred embodiment thereof disclosed herein.

By measuring the dimensions of the containers, any involved manufacturing dimension tolerance can efficiently and accurately be determined. Like this, an appropriate compensation structure can be selected for each container individually. The individual compensation structures can then be provided to the respective containers and the number of containers can efficiently be further processed, e.g., closed at once. Like this, an efficient, fast and accurate seal closing of the containers can be implemented.

The method according to the invention and its preferred embodiments described below allow for efficiently achieving the effects and benefits described in connection with the closure processing equipment describe above and its preferred embodiments described above.

Preferably, closing each of the openings of the number of containers comprises mounting a cage member to each of the number of containers to hold the number of stopper members. By means of the cage members the stopper members can be fixed to the containers, wherein the stopper members can be held in a compressed or pushed state. This allows for assuring tightness of the closing over a comparably long period of time.

A force applied to the cover portion of the stopper member appropriate to achieve a sufficient tightness can be in a range from about 10 Newton (N) to about to about 100

N depending on the material characteristics and geometry of the stopper member and other components. For example, it can be about 15 N. Like this, the stopper member can be compressed such that an appropriate tightness between stopper member and container can be achieved and maintained.

The cage members can particularly be made of a shape-retentive material. The term "shape retentive" as used in this context relates to a material or structure being capable of maintaining its form when no force is applied. In particular, the shape-retentive material can be dimensionally stable. Typically, shape-retentive materials are comparably rigid. Particularly, the material of the cage member can be more rigid than the material of the stopper member. Also, the shape-retentive material advantageously is sufficiently elastic to allow deformation to a certain extent. Such shape-retentive material can be a plastic or a metal such as, in particular, a steel or stainless steel.

Furthermore, the cage member can have a locking structure configured to engage a corresponding structure of the respective container, a lid section and in intermediate section between the lid section and the locking structure. When the locking structure engages the corresponding structure, the cage member typically is locked or fixed to the container.

The corresponding structure of the container can be a groove or a similar indentation provided at an outer surface of the container. For example, in case the container has a body, a neck and a head with the opening of the container, the groove can be provided at a circumference of the head. Also, the corresponding structure can be an outer shape of the container such as a transition from the head to the neck.

Engaging the corresponding structure can, e.g., be implemented by clipping the corresponding structure. The term "clip" as used herein relates to snapping into or behind the corresponding structure, or a similar mechanism. Generally, such clipping typically involves an elastic deformation or dislocation of one element, such as the cage member, when moving two elements, such as the cage member and the container, together and then elastically deforming the one element back behind a structure of the second element once the two elements are properly positioned. More specifically, for allowing such clipping the cage member can be elastically deformed or bent.

Preferably, providing each of the number of containers with one of the selected compensation structures comprises obtaining a stopper holder having a number of stopper seats and positioning the selected compensation structures in the stopper seats.

Preferably, the set of compensation structures is embodied by the cover portions of the stopper members having diverse cover thicknesses to compensate different container manufacturing dimension tolerances.

Thereby, selecting a compensation structure of the set of compensation structures per container of the number of containers preferably comprises selecting a stopper member of the stopper members per container of the number of containers having a cover portion with a cover thickness suitable to compensate the determined container manufacturing dimension tolerance of the respective container.

Preferably, the set of compensation structures comprises container seat inserts having diverse insert thicknesses to compensate different container manufacturing dimension tolerances.

Thereby, selecting a compensation structure of the set of compensation structures per container of the number of containers preferably comprises selecting a container seat insert of the container seat inserts per container of the number of containers having an insert thickness suitable to compensate the determined container manufacturing dimension tolerance of the respective container.

Preferably, measuring a dimension of each one of the number of containers comprises optical measuring of the dimension of each one of the number of containers. Optical measuring can, e.g., efficiently be implemented by a scanner or the like. Such optical measurement allows for efficiently and accurately measuring the height of the containers.

BRIEF DESCRIPTION OF THE DRAWINGS

The closure processing equipment according to the invention and the method according to the invention are described in more detail hereinbelow by way of exemplary embodiments and with reference to the attached drawings, in which.

DESCRIPTION OF EMBODIMENTS

In the following description certain terms are used for reasons of convenience and are not intended to limit the invention. The terms "right", "left", "up", "down", "under" and "above" refer to directions in the figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented, and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1:
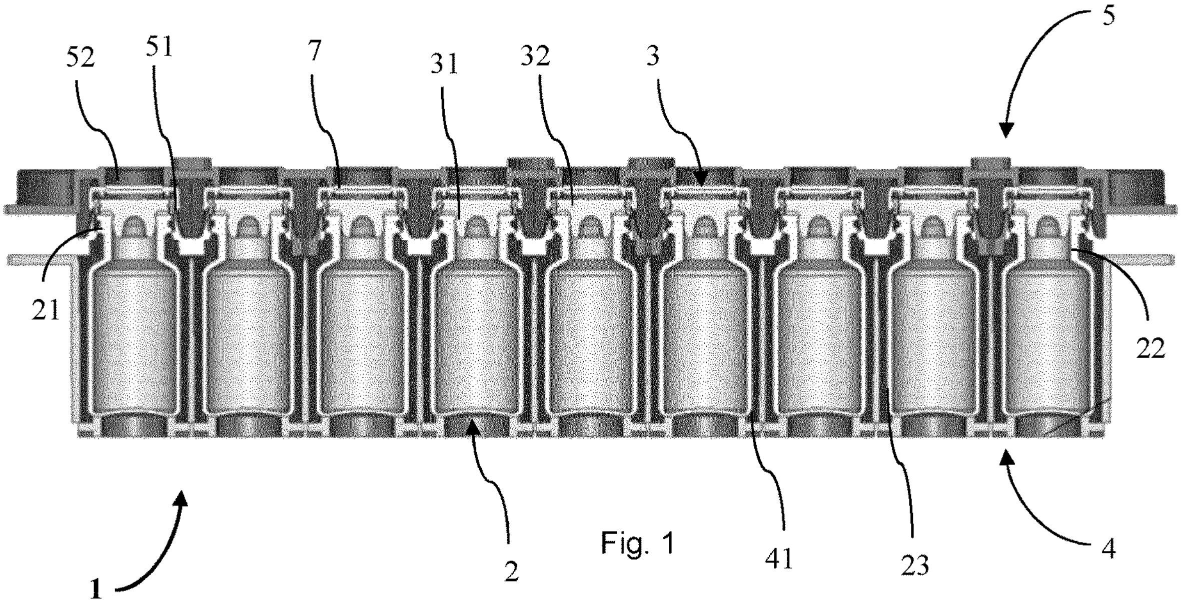
FIG. 1 shows a cut side view of an embodiment of a closure processing equipment according to the invention.

FIG. 1 shows an embodiment of a closure processing equipment 1 according to the invention. The closure processing equipment 1 comprises a vial holder 4 as container holder with a plurality of vial seats 41 as container seats and a stopper holder 5 with a plurality of stopper seats 51. The vial seats 41 are regularly arranged in ten straight rows each having nine container seats 41. In FIG. 1 one row of vial seats 41 is depicted. The stopper seats 51 are correspondingly arranged in ten rows each having nine stopper seats, such that one stopper seat 51 is neighbouring one vial seat 41. More specifically, on top of each vial seat 41, a stopper seat 51 is positioned, when the stopper holder 4 is properly arranged on the container holder 5.

Each of the stopper seats 51 holds a stopper 3 as stopper member and a clip cage 7 as cage member. The stoppers 3 are monolithically made of an elastic material. Each stopper 3 has a plug portion 31 and a cover portion 32 radially protruding the plug portion 31. The clip cages 7 are made of a rigid but to a certain extent elastic metallic material such as stainless steel. Alternatively, the clip cages 7 may also be made of a resilient plastic such as, e.g., polybutylene terephthalate (PBT), polyoxymethylene (POM), or the like.

Figure 2:
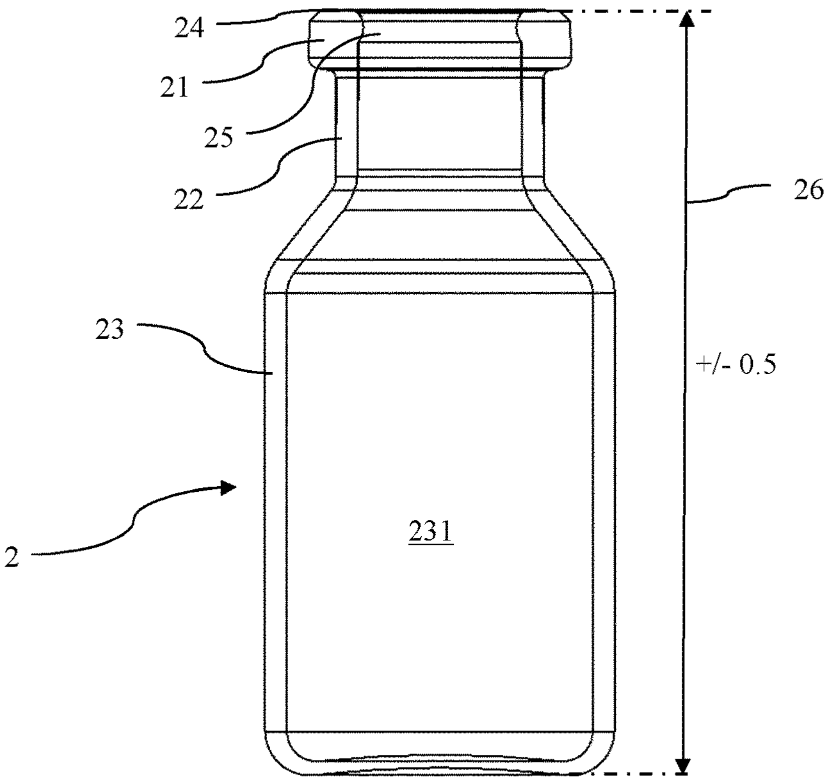
FIG. 2 shows a side view of a vial as an embodiment of a container to be closed by means of the closure processing equipment of FIG. 1.

Each of the vial seats 41 of the vial holder 4 receives a plastic or glass vial 2 as container. As can be best seen in FIG. 2, each vial 2 has a body 23 with a hollow interior 231 and a neck 22 passing over into a head 21. Further, each vial 2 has a circular or cylindrical opening 25 at its head 21 which allows to access the interior 231 of the body 23. A boundary surface 24 adjacent to the opening 25 is designed as a flat upwardly oriented surface. A distance between the vial's 2 bottom end and a top end, i.e. the boundary surface 24, defines a height 26 of the vial 2. The vials 2 are manufactured in accordance with a standard which allows a total height tolerance of +/−0.5 mm.

Returning to FIG. 1, for closing the vials 2 after filling the interiors 231 with a specific amount of a substance and lyophilizing the substance inside the vials 2, the plug portions 31 of the stoppers 3 are forwarded top down into the openings 25 of the vials 2. Thereby, the plug portions 31 are tightly fitted into the opening 25 and the cover portions 32 are configured to abut the boundary surface 24. More specifically, the plug portions 31 are dimensioned such that they are radially compressed when being pushed into the openings 25 thereby tightening the openings 25 of the vials 2. For further increasing tightness, the cover portions 32 are pushed onto the boundary surfaces 24 of the vials 2 such that they are compressed. The cover portions 32 are then held in such compressed state by the clip cages 7 being snap fitted to the heads 21 of the vials 2.

For providing the closing of the vials 2 each stopper seat 51 of the stopper holder 5 is equipped with a bore 52 through which the respective clip cage 7 and stopper 3 is accessibly when received by the stopper seat 51. In an automated process, e.g. using legacy equipment, all clip cages 7 and stoppers 3 are uniformly accessed and processed through the bores 52 by an appropriate tool. However, due to the manufacturing height tolerance of each vial 2, such uniform processing usually results in a non-homogenous force applied to the stoppers 3 such that a non-uniform compression of the cover portions 32 of the stoppers 3 would result which might decrease the level and quality of tightness of the closure.

For improving the closure tightness independent from the manufacturing height tolerances of the vials 2, the closure processing equipment 1 comprises two sets of compensation structures, wherein each of them or a combination of them is suitable to eliminate or reduce inhomogeneous compression of the stoppers 3.

Figure 3:
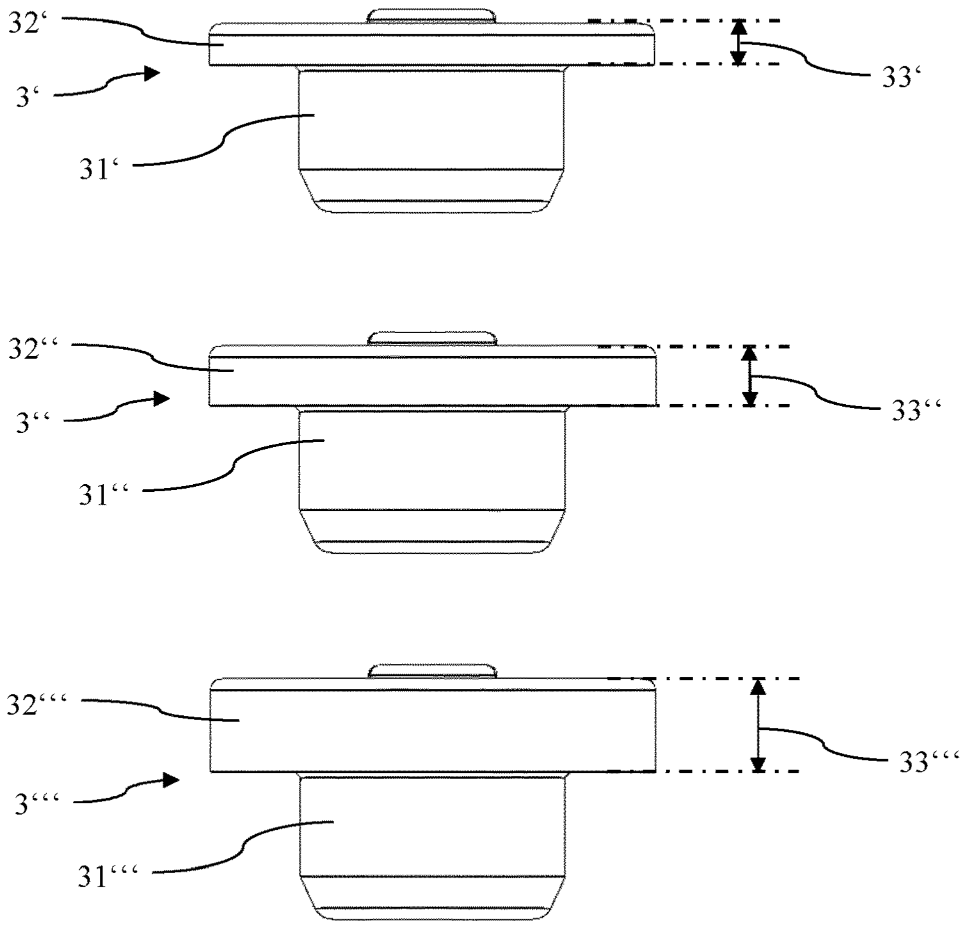
FIG. 3 shows a side view of a first set of compensation structures of the closure processing equipment of FIG. 1.

The first set of compensation structures is shown in FIG. 3. It is embodied by the stoppers 3. Basically, the cover portion 31 of each stopper 3 has a cover thickness 33. The set of compensation structures comprises three types of stoppers 3', 3", 3'" each having a different cover thickness 33', 33", 33'" configured to compensate a specific manufacturing height tolerance of the associated vial 2. Thus, the three types of stopper members 3', 3", 3'" have cover portions 31', 31", 31'" with diverse cover thicknesses 33', 33", 33'" to compensate different container manufacturing height tolerances. More specifically, a first type of stoppers 3' has a cover section 31' with a first cover thickness 33', a second type of stoppers 3" has a cover section 31" with a second cover thickness 33" and a third type of stoppers 3" has a cover section 31'" with a third cover thickness 33'". The first cover thickness 33' is smaller than the second cover thickness 33" which is smaller than the third cover thickness 33'".

Figure 4:
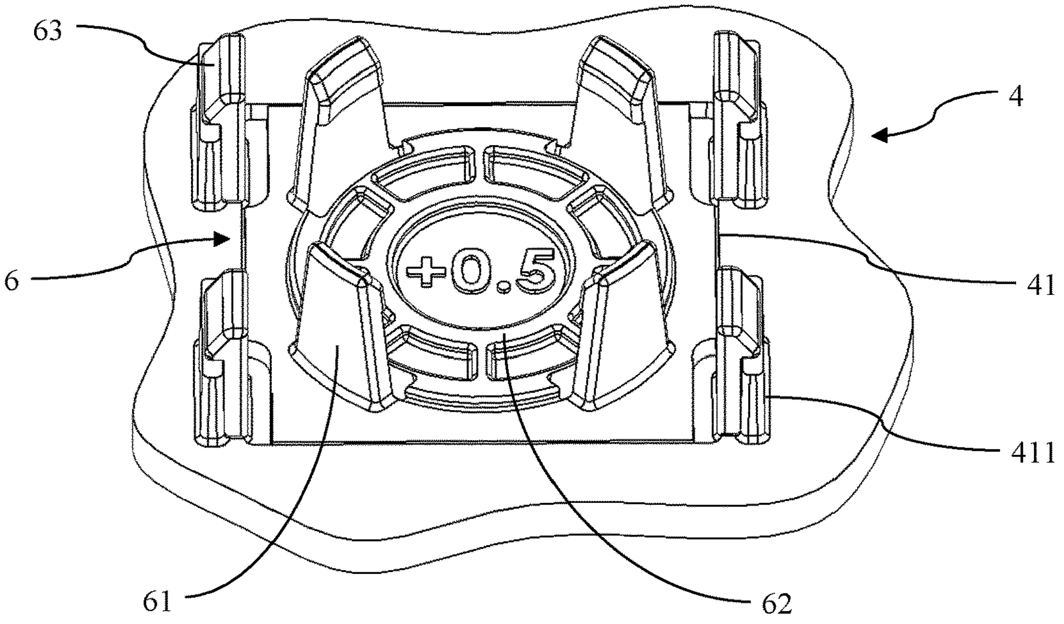
FIG. 4 shows a perspective view of a container seat insert of a second set of compensation structures of the closure processing equipment of FIG. 1.

FIG. 4 shows one exemplary part of the second set of compensation structures of the closure processing equipment 1. The second set of compensation structures comprises container seat inserts 6 configured to be arranged in one of the container seats 41 of the container holder 4. Each seat insert 6 comprises a base plate of square shape which is equipped with four lateral mounting clips 63 upwardly extending from the base plate. The seat insert 6 is set in one of the vial seats 41 of the vial holder 4. Each vial seat 41 has four counterpart protrusions 411 corresponding to the mounting clips 63 of the seat inserts 6. More specifically, the seat inserts 6 are mounted in the vial seats 41 by means of the mounting clips 63 engaging the counterpart protrusions 411.

Figure 5:
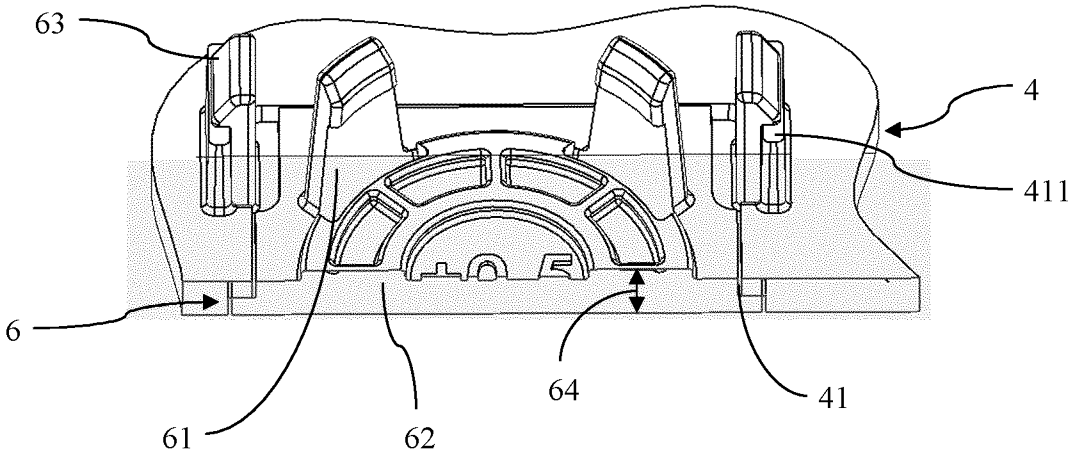
FIG. 5 shows a cut perspective view of the container seat insert of FIG. 4.

Centrally, the base plate of each seat insert is equipped with a circular vial rest 62 configured to support one of the vials 2. About the vial rest 62 four clamping fingers 61 upwardly extend from the base plate. As can be best seen in FIG. 5, the vial rest 62 defines an insert thickness 64. The second set of compensation structures comprises seat inserts 6 having diverse insert thicknesses 64 to compensate different container manufacturing height tolerances.

Figure 6:
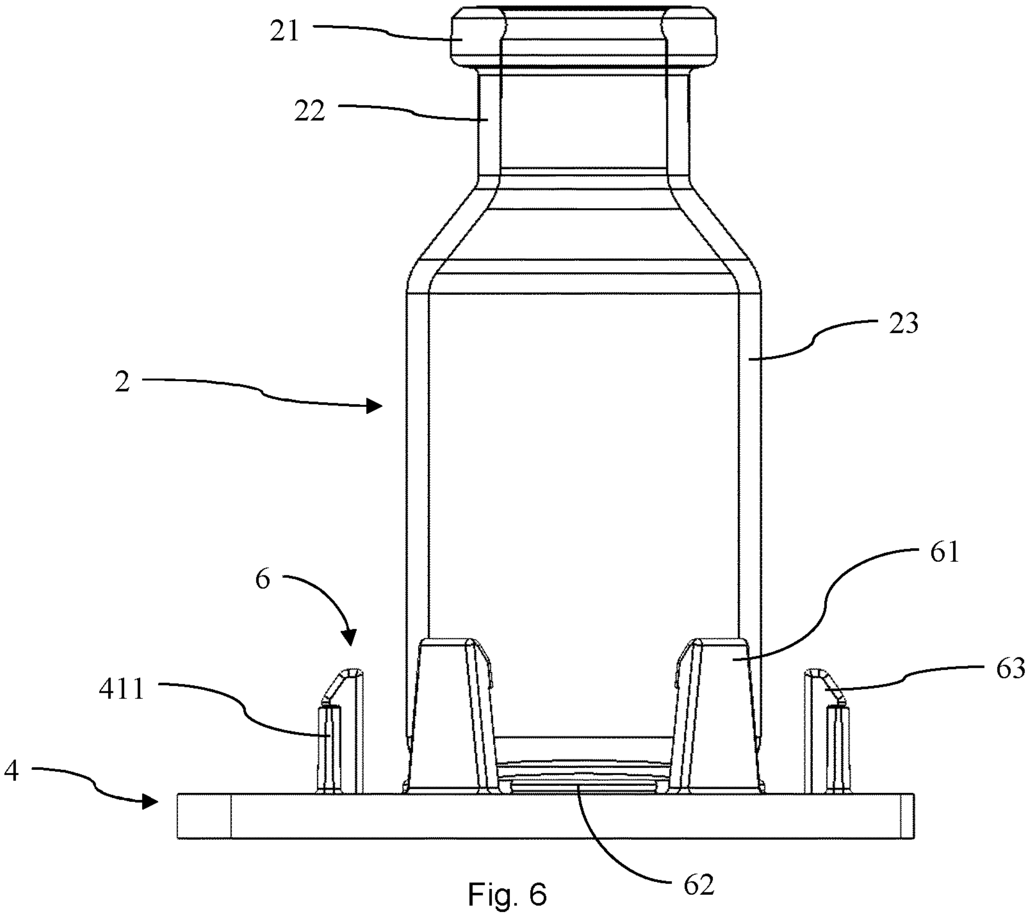
FIG. 6 shows a side view of the vial of FIG. 2 positioned in the container seat insert of FIG. 4.

In FIG. 6 one of the vials 2 is shown when being received in the vial seat 41. The vial 2 is positioned on the vial rest 62 of the seat insert 6 mounted to the vial seat 41 and the clamping fingers 61 hold the body 23 of the vial 2. Thereby, the seat insert 6 defines a position and, in particular, a vertical location of a bottom of the vial 2. More specifically, the insert thickness 64 determines the vertical location of the vial 2, i.e. the bigger the insert thickness 64, the more the vial 2 is vertically lifted such that the top end or the vertical location of the boundary surface 24 is defined.

The closure processing equipment 1 can be particularly efficient when used in an embodiment of a method according to the invention. For example, in accordance with the invention the closure processing equipment can be used as follows.

The plurality of vials 2 is obtained and each vial is scanned in order to measure its individual height. Like this, for each vial 2 its container manufacturing height tolerance is determined. Based on the determined manufacturing height tolerance, a combination of one of the stoppers 3 of the first set of compensation structures and one of the seat inserts 6 of the second set of compensation structures is selected for and associated to each vial 2 such that the manufacturing height tolerance of each individual vial 2 can accurately be compensated by the specifically selected combination.

The vial seats 41 of the vial holder 4 and the stopper seats 51 of the stopper holder 5 are then loaded with the combinations of seat insert 6 and stopper 3 such that the associated combination of each vial 2 is arranged in corresponding vial seat 41 and stopper seat 51. Then each vial 2 is set into its associated vial seat 41 such that it is positioned on the vial rest 62 of the associated seat insert 6.

The stopper holder 5 is positioned on top of the vial holder 4 such that the associated stopper 3 is adjacent to the opening 25 each vial 2. After processing the vials or their content, e.g. by filling and/or lyophilisation, the vials 2 are closed at once by fitting the plug portions 31 of the associated stoppers 3 into the opening 25 and pressing the cover portions 31 of the associated stoppers 3 to the boundary surfaces 24 of the vials 2. More specifically, the stoppers 3 are provided into and pressed onto the vials 4 by snap fitting the clip cages 7 with a uniform pressure force onto the heads 21 of the vials 2.

By providing each vial 2 with its individual combination of stopper 3 and vial insert 6, it is achieved that a uniform and accurately predefined compression of the stoppers 3 results. Like this, manufacturing height tolerances of the vials 2 can all efficiently be compensated such that an appropriate and accurate tightness can be achieved when closing the vials 2.

This description and the accompanying drawings that illustrate aspects and embodiments of the present invention should not be taken as limiting—the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the FIGS. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

The invention claimed is:

1. A closure processing equipment for closing openings of a number of containers, the closure processing equipment comprising:

a number of stopper members;

a container holder; and a set of compensation structures, each compensation structure configured to compensate a container manufacturing dimension tolerance, wherein each stopper member of the number of stopper members is made of an elastic material, has a plug portion configured to fit into an opening of one of the number of containers and has a cover portion configured to abut a boundary surface adjacent to the opening of the one of the number of containers, wherein the container holder has a number of container seats, each container seat configured to receive one of the number of containers in a predefined position, wherein the set of compensation structures comprises diverse compensation structures to compensate different container manufacturing dimension tolerances, and wherein the set of compensation structures is embodied by the number of stopper members, and/or comprises container seat inserts, each container seat insert configured to be arranged in one of the container seats of the container holder.

2. The closure processing equipment of claim 1, wherein the number of container seats of the container holder is arranged in a grid of a first number of rows and a second number of columns.

3. The closure processing equipment of claim 1, further comprising a stopper holder having a number of stopper seats, each stopper seat configured to receive one stopper member of the number of stopper members in a predefined position.

4. The closure processing equipment of claim 3, wherein the number of stopper seats of the stopper holder is arranged in correspondence with the number of container seats of the container holder.

5. The closure processing equipment of claim 1, wherein the cover portion of each stopper member of the number of stopper members has a cover thickness configured to compensate a container manufacturing dimension tolerance.

6. The closure processing equipment of claim 5, wherein the number of stopper members comprises stopper members having cover portions with diverse cover thicknesses to compensate different container manufacturing dimension tolerances.

7. The closure processing equipment of claim 1, wherein each container seat insert has an insert thickness configured to compensate a container manufacturing dimension tolerance.

8. The closure processing equipment of claim 7, wherein the container seat inserts have diverse insert thicknesses to compensate different container manufacturing dimension tolerances.

9. The closure processing equipment of claim 1, wherein each container seat insert comprises a base plate and at least one mounting clip upwardly extending from the base plate.

10. The closure processing equipment of claim 9, wherein each container seat includes at least one counterpart protrusion configured to engage the at least one mounting clip of one of the container seat inserts.

11. The closure processing equipment of claim 9, wherein a bottom of one of the containers received in one of the container seats is configured to be positioned on the base plate of one of the container seat inserts to vertically lift a top end of the one of the containers within the one of the container seats.

12. The closure processing equipment of claim 1, wherein each container seat insert is configured to be removably mounted in one of the container seats via mating pairs of mounting clips and counterpart protrusions.

13. A method of closing openings of containers, the method comprising:

obtaining a number of containers, each container having an opening;

measuring a dimension of each one of the number of containers to determine a container manufacturing dimension tolerance for each of the number of containers;

obtaining a number of stopper members made of an elastic material, each stopper member having a plug portion configured to fit into an opening of one of the number of containers and a cover portion configured to abut a boundary surface adjacent to the opening of the one of the number of containers;

obtaining a container holder having a number of container seats, each container seat configured to receive one of the number of containers in a predefined position;

obtaining a set of compensation structures comprising diverse compensation structures to compensate different container manufacturing dimension tolerances;

based on the determined container manufacturing dimension tolerances of the number of containers, selecting a compensation structure of the set of compensation structures per container of the number of containers suitable to compensate the determined container manufacturing dimension tolerance of the respective container;

positioning the number of containers in the number of container seats of the container holder;

providing each container of the number of containers with one of the selected compensation structures that is suitable to compensate the respective determined container manufacturing dimension tolerance of the respective container; and closing each opening of the openings of the number of containers by fitting the plug portion of one of the stopper members into the respective opening and abutting the cover portion of the one of the stopper members to a boundary surface adjacent to the respective opening.

14. The method of claim 13, wherein closing each opening of the openings of the number of containers comprises mounting a cage member to each container of the number of containers to hold the number of stopper members.

15. The method of claim 13, wherein providing each container of the number of containers with one of the selected compensation structures comprises obtaining a stopper holder having a number of stopper seats and positioning the selected compensation structures in the number of stopper seats.

16. The method of claim 13, wherein the set of compensation structures is embodied by the cover portions of the stopper members that have diverse cover thicknesses to compensate different container manufacturing dimension tolerances.

17. The method of claim 16, wherein selecting a compensation structure of the set of compensation structures per container of the number of containers comprises selecting a stopper member of the stopper members per container of the number of containers that has a cover portion with a cover thickness suitable to compensate the determined container manufacturing dimension tolerance of the respective container.

18. The method of claim 13, wherein the set of compensation structures comprises container seat inserts having diverse insert thicknesses to compensate different container manufacturing dimension tolerances.

19. The method of claim 18, wherein selecting a compensation structure of the set of compensation structures per container of the number of containers comprises selecting a container seat insert of the container seat inserts per container of the number of containers that has an insert thickness suitable to compensate the determined container manufacturing dimension tolerance of the respective container.

20. The method of claim 13, wherein measuring a dimension of each one of the number of containers comprises optically measuring the dimension of each one of the number of containers.

* * * * *